April 17, 1962   E. A. SALTARELLI ET AL   3,029,598
METHOD OF USING OXALIC ACID AS A COOLING AGENT
Filed March 20, 1957
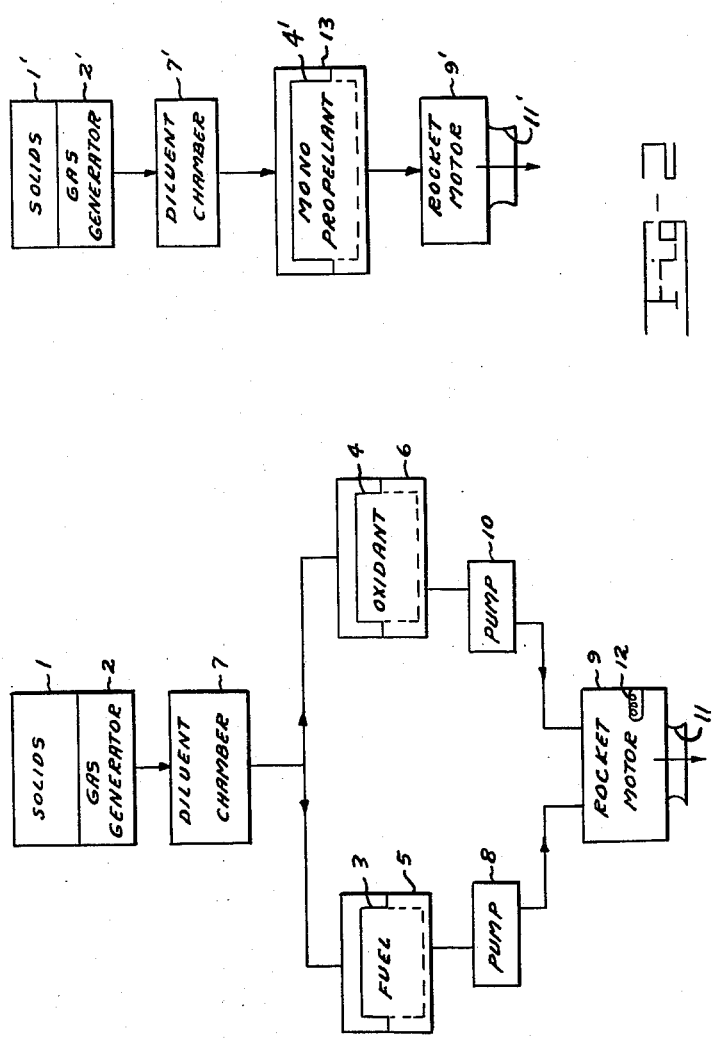
INVENTORS
EUGENE A. SALTARELLI
WILLIAM H. BERGDORF
BY
ATTORNEYS 3,029,598
METHOD OF USING OXALIC ACID AS A COOLING AGENT
Eugene A. Saltarelli, Pittsburgh, Pa., and William H. Bergdorf, Tonawanda, N.Y., assignors to the United States of America as represented by the Secretary of the Air Force
Filed Mar. 20, 1957, Ser. No. 647,461
6 Claims. (Cl. 60—35.3)

This invention relates to the use of oxalic acid as a gas cooling agent and as a diluent and more particularly to the use of oxalic acid with and as a supplement to gas generator equipment, such as the gas generator equipment which supplies propulsion energy to rocket powered missiles and the like.

As a background for assuring a sufficient understanding of the present invention as claimed, oxalic acid is an organic acid of the composition $(COOH)_2$ which in its crystalline form contains two molecules of water of crystallization and which decomposes with the absorption of heat to form carbon dioxide and water.

Jet propulsion motors are driven through space by a monopropellant or by a dipropellant which are supplied through one-way valved conduits to the combustion zone of a rocket motor. Within the combustion zone of the rocket motor the propellant may be ignited initially by a heated coil, a spark, a squib or the like, after which the temperature of the motor combustion zone may maintain the ignition of the fuels supplied to the motor during its operation.

Representative monopropellants are disclosed in U.S. Letters Patent No. 2,645,079, issued to Thomas F. Doumani and Clarence S. Coe on July 14, 1953. Dipropellants commonly consist of a fuel in one tank and an oxidizer of that fuel in another tank, such as the fuel kerosene and the oxidant fuming nitric acid or the like. The fuel and its oxidant are brought together as a hypergolic mixture within the combustion chamber of the rocket motor. The great increase in rocket propellant volume from the solid or from the liquid physical state to the gaseous state, and by its emission as gas from the outlet port of the rocket motor functions to propel the rocket. The monopropellant and the dipropellant may be fluids, characterized as liquids or as suspensions of comminuted solids in a liquid or a gas, as described in U.S. Letters Patent No. 2,636,342, issued to George N. Cade on April 28, 1953. The rocket motor propellant preferably is maintained under a substantially constant pressure, independently of the flight pattern, changes in altitude, changes in temperature or the like, to which the missile is subjected.

Pumps commonly drive the missile propellant directly into the combustion chamber of the rocket motor. Pump cavitation may be prevented by maintaining a sufficient pressure at the pump input. Stored gas may be used for avoiding pump cavitation and as a means for pressurizing rocket propellant tanks in a rocket powered missile or the like. The use of pumps and of stored gas burdens the missiles with both the weight and the volume of the equipment and with means for both operating the equipment and for controlling its rate of flow. In an effort to eliminate the use of stored gas as a means for pressurizing propellant tanks in a rocket powered missile a solid containing gas generator has been considered. The gas generator is designed for supplying gas for maintaining a substantially constant pressure upon a missile fluid propellant. The gas, which is emitted from the gas generator, is at a temperature which is considerably above the temperature at which it may be applied to the fuel propellant of the missile. The object of this invention is to reduce the temperature of the gas generator output to a usable degree by exercising a cooling action and a diluent action on the hot gas.

A brief summary of the present invention follows, indicating its nature and its substance together with a statement of the object of the invention commensurate and consistent with the invention as claimed. The summary sets out the exact nature, the operation and the essence of the invention, complete with proportions and techniques which are necessary for its use. The purpose of the invention also is stipulated. The presentation is adequate for any person who is skilled in the art and science to which the invention pertains to use it without involving extensive experimentation. The best mode of carrying out the invention is presented by the citing of a specific, satisfactorily operating example, inclusive of the preparation and the use of at least one example of the invention.

In the accompanying drawing:

FIG. 1 is a flow sheet for rocket propulsion using dipropellants and embodying the present invention; and FIG. 2 is a flow sheet for rocket propulsion using a monopropellant and embodying the present invention.

The gas generator which is contemplated hereby and which is a part of a suitable flow sheet such as that which is shown in FIG. 1 of the accompanying drawing, consists of a storage first compartment 1 containing a gas supplying material, which illustratively may be in a solid state for compactness, and a second compartment gas generator 2 wherein predetermined portions of the material supplied from the first compartment are converted into the gaseous state, such as by heat.

The gas so produced may be applied on one side of the diaphragms or the bladders 3 and 4, which separate each of a pair of rocket dipropellant containing tanks 5 and 6, respectively, into two separately sealed compartments. Diaphragms 3 and 4 may be of rubber, a polymer of the plastic type, leather, a metal bellows or the like.

The gas produced by the above described generator 2 is conducted to the propellant containing tanks 5 and 6 where it maintains a substantially constant pressure upon that side of the diaphragms 3 and 4 which is not in contact with the fluid rocket propellant. The temperature of the gas which is supplied from the gas generator 2 may be above that at which the gas may be safely applied to a rubber or a plastic diaphragm.

In accordance with the present invention the temperature of the gas from the gas generator 2 is reduced to a predetermined upper temperature limit by a suitable means, such as by causing the gas from the gas generator to pass through a diluent chamber 7 which is interposed in the flow sheet between the outlet from the gas generator 2 and the inlet into the gas receiving side of the rocket propellant tanks 5 and 6.

The diluent chamber 7 illustratively may contain oxalic acid in a proportion of about 1¼ pounds of oxalic acid for every pound of solid material supplied from the tank 1 to the gas generator 2. The heat absorbed by the diluent reduces the temperature of the gas supplied by the gas generator 2 to the gas contacted side of the rocket propellant tank diaphragms 3 and 4 to below an upper temperature limit which is not destructive of the diaphragms.

The solid materials within the tank 1 and which are supplied to the gas generator 2 at a predetermined rate, may have a desired composition for a particular installation. Illustratively the tank 1 may contain nitrocellulose, nitroglycerine, desired mixtures of oxygen, hydrogen, nitrogen or the like to produce carbon dioxide, water vapor, nitrogen, etc. The materials disclosed in the above cited Cade patent may be taken as being illustrative of the materials in the tank 1.

Fuel from the fuel side of the diaphragm 3 in the fuel tank 5 may be passed through a fuel pump 8 into the combustion chamber of the rocket motor 9. The oxidant from the oxidant side of the diaphragm 4 in the oxidant tank 6 may be passed through an oxidant pump 10 into the combustion chamber of the rocket motor 9. In the dipropellant system the fuel and its oxidant ignite as a hypergolic mixture in the combustion chamber of the rocket motor 9 and serve to propel the missile by their exhaustion through the port 11 of the rocket motor 9. Operating temperatures within the rocket motor may be around 3200° F.

A heated coil 12, spark, squib or the like, may serve to initiate, or to both initiate and to maintain combustion within the rocket motor 9. As fuel and oxidants are withdrawn from the tanks 5 and 6, respectively, the bladder in each tank collapses, as indicated by the dotted lines shown. The oxalic acid in the diluent chamber 7 reduces the temperature of the gases from the gas generator 2 to an extent such that the diaphragms 3 and 4 are not destroyed, at least during the period between the launching of the missile and the time at which it arrives on target.

In FIG. 2 of the accompanying drawings is shown a monopropellant flow sheet, wherein parts which correspond with like parts in FIG. 1 have the same reference numbers primed. In the monopropellant adaptation a diaphragm 4' divides the chamber 13 into two separate compartments. The monopropellant may be passed from its tank through a pump, not shown, into the combustion chamber of the rocket motor 9', corresponding to the pumps used in FIG. 1 herein, if desired, to attain the input pressure required for suitable performance, which illustratively may be in the neighborhood of about 500 pounds per square inch.

It is to be understood that the use of oxalic acid in the installation which is described and explained herein has been submitted for the purpose of illustrating a successfully operative embodiment of the present invention and that similarly functioning reagents and procedures may be substituted for the expressed details of the present invention without departing from the spirit thereof.

We claim:

1. The process of supplying the combustion chamber of a rocket motor through one-way valved conduits with a rocket motor propellant for the ignition of the propellant within the combustion chamber of the rocket motor and the propulsion of the rocket containing the motor, by supplying the motor with its propellant from a tank that is subdivided internally by a diaphragm with the propellant on one side of the diaphragm and a gas on the other side of the diaphragm within the tank, maintaining the gas against the diaphragm at a pressure in excess of the pressure of the propellant within the tank, producing the gas within a gas generator at a temperature in excess of the temperature at which it is applied to the diaphragm, conducting the generated gas from the gas generator through a diluent chamber to the tank, and adding oxalic acid to the generated gas within the diluent chamber for diluting the gas with carbon dioxide and water vapor and reducing the temperature of the gas to the temperature at which it is applied to the diaphragm.

2. In a method for operating the fuel flow to a jet propulsion motor, wherein a propellant is supplied through a conduit to the combustion chamber of the motor for its combustion and the products of combustion being discharged through an outlet port of the motor, the improvement which consists of supplying to the motor combustion chamber a propellant under pressure conducted to the motor combustion chamber through a conduit leading from a propellant tank containing the propellant and a flexible diaphragm against one side of which diaphragm the propellant is in contact, maintaining within the propellant tank a gas pressure against the side of the diaphragm opposite to that contacting the propellant and through the diaphragm applying the pressure to the propellant, generating the gas within a gas generator at a temperature in excess of the temperature of the gas pressing against the diaphragm within the propellant tank, conducting the gas from the gas generator by way of a conduit to a diluent chamber, mixing the gas from the gas generator discharging conduit within the diluent chamber with oxalic acid with the absorption of heat from the gas to the oxalic acid and with the dilution of the gas by the oxalic acid, and conducting the diluted gas mixture through a conduit to the gas-contacting side of the diaphragm within the propellant tank.

3. In the process of supplying fuel to a jet propulsion motor, the improvement of generating a gas within a gas generator connected by a conduit to a diluent chamber, mixing the gas with oxalic acid within the diluent chamber for controlling both the degree of dilution and the temperature of the gas in the diluent chamber that is connected by a conduit to a propellant tank containing a diaphragm with the diluted gas on one side of the diaphragm and a jet propulsion motor fuel on the other side of the diaphragm, causing the diluted gas within the tank to apply pressure through the diaphragm on the motor fuel to force the fuel into a conduit leading from the tank to a pump, and pumping the fuel along the last conduit and into the motor.

4. In a method for operating a rocket motor in the propulsion of an aircraft wherein a propellant in a compartmented tank is passed through a one-way valved conduit to a pump and from the pump to the combustion chamber of a rocket motor where the propellant is ignited and is discharged from a port for accomplishing the propulsion of the aircraft; the improvement which comprises generating a gas from a solid gas supplying material within a gas generator at a temperature which is in excess of a safe temperature for contacting a membrane made of a material such as rubber, a polymer, leather and the like; passing the generated gas through a conduit to a diluent chamber containing oxalic acid; mixing the generated gas with oxalic acid within the diluent chamber for accomplishing the dilution of the generated gas and the reduction of the temperature of the generated gas to a composition and a temperature which are not destructive of the membrane material; passing the cooled and the diluted gas from the diluent chamber through a conduit to one compartment of the compartmented tank wherein the membrane separates the diluted gas from the propellant; and maintaining the pressure imparted by the diluted gas through the membrane to the propellant at a value adequate for overcoming cavitation at the pump which imparts pressure to the propellant supplied to the combustion chamber of the rocket motor.

5. A rocket motor propulsion apparatus comprising a rocket motor having an exhaust port and a combustion chamber to which combustion chamber a propellant is supplied through a conduit for accomplishing the operation of the motor, a compartmented propellant tank connected through a conduit to the combustion chamber of the rocket motor for the delivery thereat of the propellant pressurized, a diaphragm subdividing the interior of the propellant tank into a propellant containing compartment and a diluted gas containing compartment, a diluent chamber connected by a conduit to the diluted gas compartment of the propellant tank and the diluent chamber containing oxalic acid, and a storage compartment connected by a conduit to the diluent chamber and containing a gas supplying material and wherein a gas may be generated from the gas supplying material within the storage compartment for pressurizing the propellant through the diaphragm within the propellant tank.

6. The propulsion apparatus defined by the above claim 5 inclusive of a pump connected by conduits to both the propellant containing side of the propellant tank and to the combustion chamber of the rocket motor.

References Cited in the file of this patent
UNITED STATES PATENTS

| | | |
|---|---|---|
| 2,671,312 | Roy | Mar. 9, 1954 |
| 2,676,956 | Holzwarth | Apr. 27, 1954 |